3,024,238
AMIDODIFLUOROARSENITES
George Andrew Olah and Alexes Alexander Oswald,
Sarnia, Ontario, Canada
No Drawing. Filed July 13, 1959, Ser. No. 826,450
6 Claims. (Cl. 260—271)

This invention relates to amidodifluoroarsenites corresponding with the formula

In this and succeeding formulae, R represents di(lower-alkyl)-amino, cyclohexylamino or piperidino. The expression "lower-alkyl" is employed in the present specification and claims to refer to the alkyl radicals containing from 1–5 carbon atoms, inclusive. These compounds are liquid or crystalline solid materials which are somewhat soluble in many organic solvents and slowly undergo hydrolysis in the presence of water. The compounds are useful as intermediates for the preparation of a great number of more complex arsenic derivatives. The compounds have also been found to be useful as parasiticides and are adapted to be employed as active toxic constituents of compositions for the control of a number of fungal, bacterial, mite and insect pests.

The new compounds may be prepared by reacting arsenic trifluoride with a di(lower-alkyl)amine, cyclohexylamine or piperidine. The reaction is carried out in the presence of an inert organic liquid such as benzene or toluene as reaction medium. Good results are obtained when employing one molecular proportion of arsenic trifluoride with two molecular proportions of the amine reagent. The reaction is somewhat exothermic and takes place smoothly at the temperature range of from —80° to 30° C. with the production of the desired product and hydrogen fluoride of reaction. This hydrogen fluoride appears in the reaction mixture as the hydrofluoride salt of the amine reagent. The temperature may be controlled by regulating the rate of intermixing the reactants and by external cooling.

In carrying out the reaction, the arsenic trifluoride and amine reagent are contacted together in the organic liquid. The contacting is carried out under the disclosed temperature conditions, and the reaction mixture maintained for a period of time under these condiitons to complete the reaction. Upon completion of the reaction, the amine hydrofluoride of reaction is recovered by filtration and the filtrate thereafter fractionally distilled under reduced pressure to obtain the desired product.

The following examples merely illustrate the invention and are not to be construed as limiting.

EXAMPLE 1

N,N-Dimethyl Amidodifluoroarsenite

Dimethylamine (0.2 gram mole) is dispersed in 50 milliliters of toluene and the resulting mixture added portion-wise with stirring to 0.1 gram mole of arsenic trifluoride dispersed in 150 milliliters of tolune. The addition is carried out in 0.5 hour and at a temperature of from 0°–10° C. Following the addition, the reaction mixture is allowed to come to room temperature and stirred for an additional hour. Upon completion of the reaction, the reaction mixture is filtered to separate dimethylamine hydrofluoride and the filtrate fractionally distilled under reduced pressure to obtain an N,N-dimethyl amidodifluoroarsenite product as a liquid material boiling at 43°–44° C. at 40 millimeters pressure and having a refractive index $n/D$ of 1.4461 at 20° C.

EXAMPLE 2

N,N-Diethyl Amidodifluoroarsenite

Diethylamine (0.2 gram mole) is dispersed in 40 milliliters of benzene and the resulting mixture added portion-wise with stirring and cooling to 0.1 gram mole of arsenic trifluoride dispersed in 150 milliliters of benzene. The addition is carried out over a period of 30 minutes and at a temperature of from —5° to 10° C. Following the addition, the reaction mixture is allowed to come to room temperature and stirred for an additional 1.5 hours. The reaction mixture is thereafter processed as described in Example 1 to obtain an N,N-diethyl amidodifluoroarsenite product as a liquid material boiling at 39°–40° C. at 20 millimeters pressure and having a refractive index $n/D$ of 1.4857 at 20° C. and a nitrogen content of 7.57 percent as compared with a theoretical content of 7.59 percent.

EXAMPLE 3

N,N-Pentamethylene Amidodifluoroarsenite

Piperidine (0.2 gram mole) is dispersed in 50 milliliters of toluene and the resulting mixture added portion-wise with stirring and cooling to 0.1 gram mole of arsenic trifluoride dispersed in 160 milliliters of toluene. The addition is carried out over a period of 40 minutes and at a temperature of from —5° to 10° C. Following the addition, the reaction mixture is allowed to come to room temperature and thereafter stirred for an additional hour. The reaction mixture is thereafter processed as previously described to obtain an N,N-pentamethylene amidodifluoroarsenite product as a liquid material boiling at 44°–45° C. at 10 millimeters pressure and having a refractive index $n/D$ of 1.4920 at 20° C. and a nitrogen content of 7.09 percent as compared to a theoretical content of 7 1 percent.

EXAMPLE 4

N-Cyclohexyl Amidodifluoroarsenite

Cyclohexylamine (0.2 gram mole) is dispersed in 60 milliliters of benzene and the resulting mixture added portionwise with stirring and cooling to 0.1 gram mole of arsenic trifluoride dispersed in 150 milliliters of benzene. The addition is carried out over a period of 0.5 hour and at a temperature of from 0° to 15° C. Following the addition, the reaction mixture is allowed to come to room temperature and thereafter stirred for an additional hour. The reaction mixture is then processed in the usual fashion to obtain an N-cyclohexyl amidodifluoroarsenite product as a crystalline solid melting at 65°–66° C.

In a similar manner, other amidodifluoroarsenites are prepared as follows.

N,N-diamyl amidodifluoroarsenite by reacting together arsenic trifluoride and diamylamine.

N-ethyl-N-methyl amidodifluoroarsenite by reacting together arsenic trifluoride and ethylmethylamine.

N,N-diisopropyl amidodifluoroarsenite by reacting together arsenic trifluoride and diisopropylamine.

N,N-dibutyl amidodifluoroarsenite by reacting together arsenic trifluoride and dibutylamine.

The new amidodifluoroarsenites have been found to be useful as parasiticides. For such use, the products may be dispersed on a finely divided solid and employed as dusts. Also, such products may be dispersed in water with the aid of a wetting agent and the resulting aqueous suspensions employed as sprays. In other procedures, the products may be employed in oils, as constituents in oil-in-water emulsions, or in water dispersions with or without the addition of wetting, dispersing and emulsifying agents. In representative operations, good controls of many fungal and insect pests are obtained with aqueous compositions containing from 1 to 4 pounds of the amidodifluoroarsenites per 100 gallons of ultimate mixture.

We claim:

1. An amidodifluoroarsenite corresponding with the formula

wherein R represents a member of the group consisting of di(lower-alkyl)amino, cyclohexylamino and piperidino.

2. N,N-dimethyl amidodifluoroarsenite.
3. N,N-diethyl amidodifluoroarsenite.
4. N,N-pentamethylene amidodifluoroarsenite.
5. N-cyclohexyl amidodifluoroarsenite.

6. A method for the manufacture of an amidodifluoroarsenite corresponding with the formula

wherein R represents a member of the group consisting of piperidino, cyclohexylamino and di(lower-alkyl)amino which comprises reacting about one molecular proportion arsenic trifluoride, at a temperature of from $-80°$ to $30°$ C. with two molecular proportions of a member of the group consisting of piperidine, cyclohexylamine and di(lower-alkyl)amine.

References Cited in the file of this patent

Journal of the American Pharmaceutical Association, vol. 25, June 1935, pp. 453–457.